(12) United States Patent
Kanai et al.

(10) Patent No.: US 12,056,033 B2
(45) Date of Patent: Aug. 6, 2024

(54) ANOMALY LOCATION ESTIMATING APPARATUS, METHOD, AND PROGRAM

(71) Applicant: NIPPON TELEGRAPH AND TELEPHONE CORPORATION, Tokyo (JP)

(72) Inventors: Shunsuke Kanai, Musashino (JP); Satoshi Suzuki, Musashino (JP); Haruhisa Nozue, Musashino (JP); Taisuke Yakawa, Musashino (JP); Naomi Murata, Musashino (JP); Fumika Asai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 123 days.

(21) Appl. No.: 17/760,597

(22) PCT Filed: Sep. 25, 2019

(86) PCT No.: PCT/JP2019/037619
§ 371 (c)(1),
(2) Date: Mar. 15, 2022

(87) PCT Pub. No.: WO2021/059400
PCT Pub. Date: Apr. 1, 2021

(65) Prior Publication Data
US 2022/0342788 A1 Oct. 27, 2022

(51) Int. Cl.
*G06F 11/00* (2006.01)
*G06F 9/54* (2006.01)
(Continued)

(52) U.S. Cl.
CPC ............ *G06F 11/327* (2013.01); *G06F 9/542* (2013.01); *G06F 11/0709* (2013.01);
(Continued)

(58) Field of Classification Search
CPC ............ G06F 11/0703; G06F 11/0709; G06F 11/0751; G06F 11/0781; G06F 11/0793;
(Continued)

(56) References Cited

U.S. PATENT DOCUMENTS 8,464,279 B2 * 6/2013 Gutjahr ................ H04L 41/064
709/224
9,979,608 B2 * 5/2018 MuntéS-Mulero ... H04L 41/065
(Continued)

FOREIGN PATENT DOCUMENTS

JP      201828778 A    2/2018

OTHER PUBLICATIONS

A. Dusia and A. S. Sethi, "Recent Advances in Fault Localization in Computer Networks," in IEEE Communications Surveys & Tutorials, vol. 18, No. 4, pp. 3030-3051, Fourthquarter 2016, doi: 10.1109/COMST.2016.2570599. (Year: 2016).*

*Primary Examiner* — Marc Duncan
(74) *Attorney, Agent, or Firm* — Harness, Dickey & Pierce, P.L.C.

(57) ABSTRACT

An aspect of the present disclosure acquires topology information representing a connection configuration between a plurality of apparatuses constituting a communication network and event information representing occurrence statuses of an event by the plurality of apparatuses, estimates, based on the topology information and the event information, a first apparatus corresponding to a failure factor location from among the plurality of apparatuses, estimates, based on an occurrence status of the event by a second apparatus whose connection relationship with the first apparatus estimated is defined by the topology information, whether an occurrence of the event by the second apparatus is caused by the failure factor location or by another anomaly, and estimates, based on a relationship between an occurrence status of the event by the first apparatus and an (Continued)

occurrence status of the event by a third apparatus whose connection relationship with the first apparatus is not defined by the topology information, whether an occurrence of the event by the third apparatus is caused by the failure factor location or by another anomaly.

5 Claims, 15 Drawing Sheets

(51) Int. Cl.
    *G06F 11/07*     (2006.01)
    *G06F 11/30*     (2006.01)
    *G06F 11/32*     (2006.01)
    *H04L 41/0677*     (2022.01)
    *H04L 41/0604*     (2022.01)
    *H04L 41/12*     (2022.01)

(52) U.S. Cl.
    CPC ...... *G06F 11/0781* (2013.01); *G06F 11/3006* (2013.01); *G06F 11/3072* (2013.01); *H04L 41/0677* (2013.01); *G06F 2201/86* (2013.01); *H04L 41/0604* (2013.01); *H04L 41/12* (2013.01)

(58) Field of Classification Search
    CPC ............. G06F 11/3006; G06F 11/3072; G06F 11/327; G06F 2201/86; G06F 9/542; H04L 41/06; H04L 41/0604; H04L 41/0609; H04L 41/0613; H04L 41/0618; H04L 41/0631; H04L 41/0677; H04L 41/12
    See application file for complete search history.

(56) References Cited

U.S. PATENT DOCUMENTS

2019/0361759 A1* 11/2019 Haugen ............... G06F 11/0772
2020/0042426 A1* 2/2020 Ambichl ............. G06F 11/3048

* cited by examiner

ANOMALY LOCATION ESTIMATING APPARATUS, METHOD, AND PROGRAM

CROSS-REFERENCE TO RELATED APPLICATIONS

This application is a 371 U.S. National Phase of International Application No. PCT/JP2019/037619, filed on Sep. 25, 2019. The entire disclosure of the above application is incorporated herein by reference.

TECHNICAL FIELD

An aspect of the present disclosure relates to an anomaly location estimation apparatus, a method, and a program used to estimate an anomaly location such as a failure in a communication network.

BACKGROUND ART

In order to remotely identify an anomaly occurrence location in a communication network to which a plurality of communication apparatuses are connected, there is proposed a technique for estimating an anomaly occurrence location based on many types of estimation rules prepared in advance. To optimize the estimation rules, there is also proposed a technique in which a unique combination of failure events is extracted for each failure case so as not to overlap with failure cases registered in a failure case database and a failure location determination rule corresponding to the extracted characteristic failure event is automatically created or modified (see, for example, PTL 1).

CITATION LIST

Patent Literature

PTL 1: JP 2018-28778 A

SUMMARY OF THE INVENTION

Technical Problem

When an occurrence location of an anomaly such as a failure is estimated, a condition for detecting, as an alarm, a topology or an event that represents a network configuration or the like must be correctly set. However, when there is a flaw in a topology or an alarm detection condition, an alarm due to mis-detection may occur, or an event that makes it difficult to identify a failure factor location may occur. In such a case, a maintenance person needs to determine whether an event that has occurred is caused by an anomaly such as a fault or by a failure such as a setting flaw of a topology or an alarm detection condition involved in implementation of a management operation such as a construction or maintenance, and in addition, when the event is caused by an anomaly such as a fault, the maintenance person must determine whether urgent restoration is required to perform isolation. This may require a large amount of time and effort for the work.

The present disclosure is directed to providing a technique in which it is possible to isolate whether occurrence of an alarm is caused by an anomaly such as a fault of an apparatus, or by a failure due to a setting flaw of a topology or an alarm detection condition involved in implementation of a management operation without relying on determination of a maintenance person, thereby reducing a time and effort required for anomaly location estimation.

Means for Solving the Problem

In order to solve the above-described problems, an aspect of an anomaly location estimation apparatus, a method, and a program according to the present disclosure acquires topology information representing a connection configuration between a plurality of apparatuses constituting a communication network and event information representing occurrence statuses of an event by the plurality of apparatuses, estimates, based on the topology information and the event information acquired, a first apparatus corresponding to a failure factor location from among the plurality of apparatuses, estimates, based on an occurrence status of the event by a second apparatus whose connection relationship with the estimated first apparatus is defined by the topology information, whether an occurrence of the event by the second apparatus is caused by the failure factor location or by another anomaly, and estimates, based on a relationship between an occurrence status of the event by the first apparatus and an occurrence status of the event by a third apparatus whose connection relationship with the first apparatus is not defined by the topology information, whether an occurrence of the event by the third apparatus is caused by the failure factor location or by another anomaly.

Effects of the Invention

According to an aspect of the present disclosure, a technique can be provided in which it is possible to isolate whether occurrence of an alarm is caused by an anomaly such as a fault, or by a setting flaw of a topology or an alarm detection condition involved in implementation of a management operation without relying on determination of a maintenance person, thereby reducing a time and effort required for anomaly location estimation.

DESCRIPTION OF EMBODIMENTS

Hereinafter, embodiments of the present disclosure will be described with reference to the drawings.

Embodiment

In an embodiment of the present disclosure, description will be given by taking a work as one of management operations for an example and using, as an example, a case in which a location of work performed is estimated as a failure factor location; however, the management operations are not limited to the performance of the work and also include performance of operations that may affect a topology or an alarm detection condition, such as maintenance. In this case, a location of maintenance performance or the like is estimated as the above-described failure factor location.

Configuration Example

Figure 1:
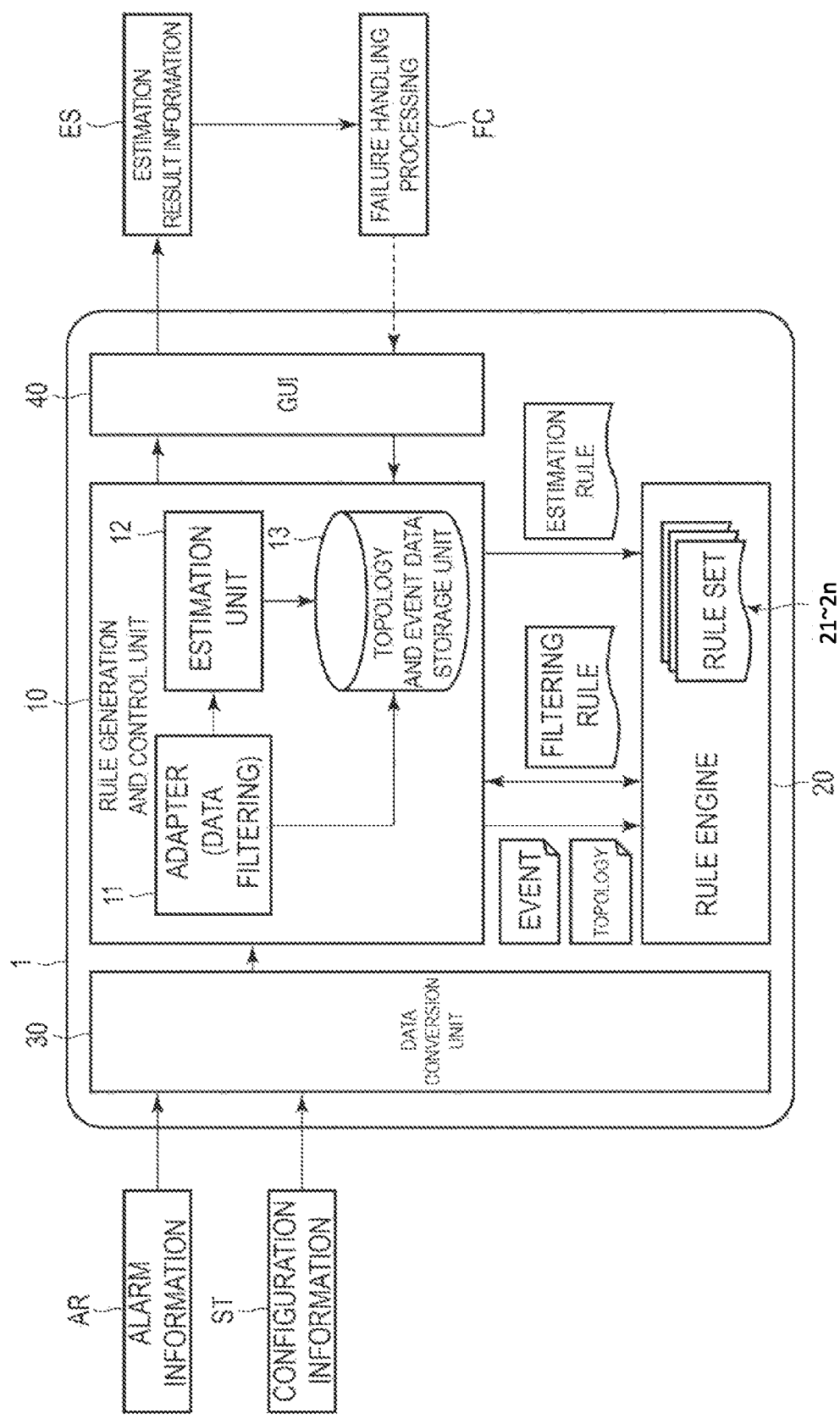
FIG. 1 is a block diagram illustrating a software configuration of an anomaly location estimation apparatus according to an embodiment of the present disclosure.
Figure 2:
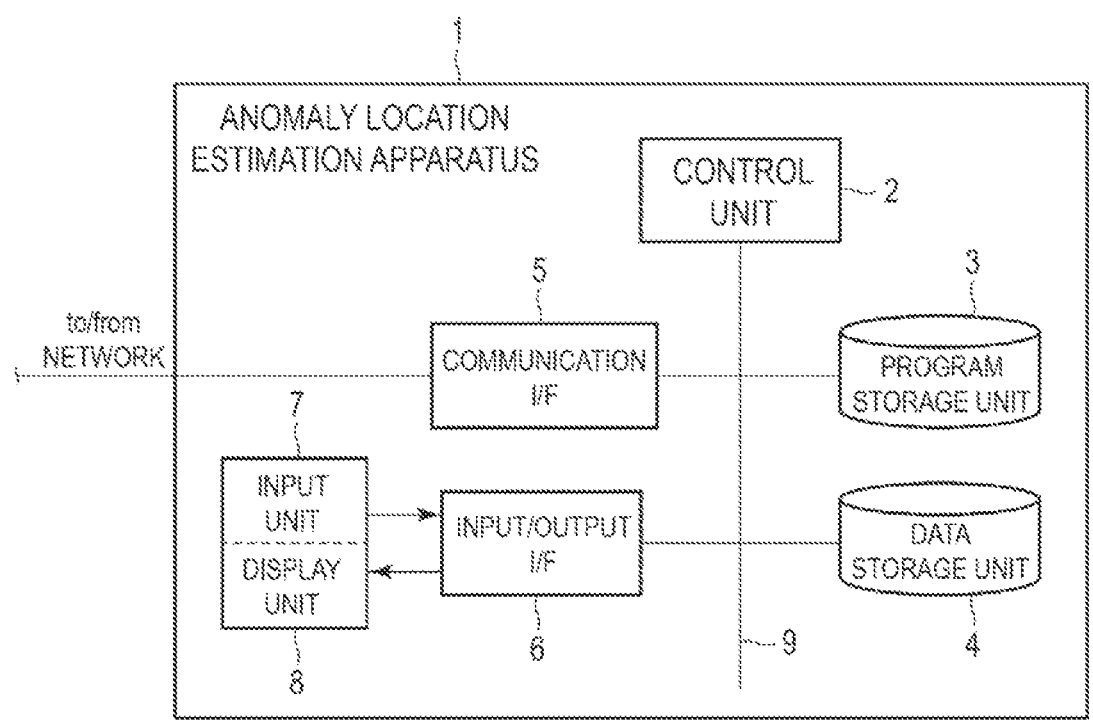
FIG. 2 is a block diagram illustrating a hardware configuration of the anomaly location estimation apparatus according to the embodiment of the present disclosure.

FIGS. 1 and 2 are block diagram illustrating an example of a software configuration and an example of a hardware configuration of an anomaly location estimation apparatus according to the embodiment of the present disclosure, respectively.

An anomaly location estimation apparatus 1 is provided in a management apparatus capable of communicating with apparatuses (also referred to as nodes) such as a router or a server constituting a communication network, or a maintenance terminal, and is constituted by a server computer or a personal computer. As illustrated in FIG. 2, in the anomaly location estimation apparatus 1, a program storage unit 3, a data storage unit 4, a communication interface unit (communication I/F) 5, and an input/output interface unit (input/output I/F) 6 are connected to a control unit 2 including a central processing unit (CPU) via a bus 9.

The communication I/F 5 performs communication with a plurality of apparatuses constituting the network and a configuration information database (not illustrated) that stores connection information between the apparatuses, and acquires alarm information AR generated by the apparatuses and network configuration information stored in the configuration information database.

An input unit 7 and a display unit 8 are connected to the input/output I/F 6. As the input unit 7 and the display unit 8, for example, a so-called tablet type input and display device in which an input detection sheet adopting an electrostatic scheme or a pressure scheme is disposed on a display screen of a display device using liquid crystal or organic electro luminescence (EL) is used. Note that the input unit 7 and the display unit 8 may be constituted by independent devices. The input/output I/F 6 inputs operation information input in the input unit 7 to the control unit 2 and causes the display unit 8 to display the display information generated in the control unit 2.

The program storage unit 3 and the data storage unit 4 are configured by combining, as a storage medium, a nonvolatile memory in which writing and reading can be performed any time, such as a hard disk drive (HDD) or a solid state drive (SSD), a nonvolatile memory such as a read only memory (ROM), and a volatile memory such as a random access memory (RAM), for example. A program necessary to execute various kinds of control processing according to the embodiment of the present disclosure is stored in the program storage unit 3. The data storage unit 4 is provided with a topology and event data storage unit 13, a storage unit for rule sets 21 to 2n described below, and a working memory for temporarily storing data generated in the process of various kinds of processing.

The anomaly location estimation apparatus 1 includes a rule generation and control unit 10, a rule engine 20, a data conversion unit 30, and a GUI 40 as an input/output I/F. Of these, the data conversion unit 30 data-converts the alarm information AR generated from the apparatuses to be monitored into event information, and data-converts configuration information ST of the network acquired from the configuration information database (not illustrated) into topology information.

The rule generation and control unit 10 includes an adapter 11 that performs filtering processing for an event, an estimation unit 12 that performs processing for estimating a failure location, and a topology and event data storage unit 13 that is used as a failure case database.

The rule engine 20 manages one or more rule sets 21 to 2n. The rule sets 21 to 2n each include a condition part and a conclusion part. In this example, the condition part is a failure event and includes, for example, an apparatus ID and an alarm type. The conclusion part is failure factor information and includes the apparatus ID and a failure factor type.

Based on the event information and the topology information provided from the data conversion unit 30, the adapter 11 estimates a work-performed location (apparatus in which the work has been performed) as a failure factor location. The adapter 11 also calculates a degree of assurance based on an event occurrence status in each of the estimated work-performed apparatus and another apparatus present at an opposed position on the topology (another apparatus with connection setting) and an apparatus not opposed on the topology (another apparatus without connection setting). Then, based on the calculated degree of assurance, the adapter 11 performs processing of estimating whether the occurrence of the alarm by the other apparatus with connection setting and the other apparatus without connection setting is caused by performance of the work or by occurrence of a failure.

The estimation unit 12 operates when it is determined that estimation of a failure location is required, as a result of the filtering processing of the adapter 11. The estimation unit 12 selectively applies the rule sets 21 to 2n managed by the rule engine 20 to the event information and the topology information provided from the data conversion unit 30 to perform estimation processing of the failure location. Furthermore, in a case where the estimation by the existing rule sets 21 to 2n fails, the estimation unit 12 extracts a unique combination of failure events from the event information, uses the extracted unique combination as the condition part, and uses failure factor information registered by a maintenance person as the conclusion part to perform learning processing, thereby newly generating a rule. The newly generated rule is then added to the rule sets 21 to 2n of the rule engine 20, and a rule ID of the newly generated rule is associated with a failure ID and stored in the topology and event data storage unit 13.

The GUI 40 causes the display unit 8 to display estimation result information ES including the filtering result by the adapter 11 of the rule generation and control unit 10 and an estimation result of the failure location obtained by the estimation unit 12. The GUI 40 receives failure factor information FC related to failure handling input from the input unit 7 by the maintenance person, for example, based on the estimation result information ES displayed, and inputs the failure factor information FC to the rule generation and control unit 10.

Operation Example

Figure 3:
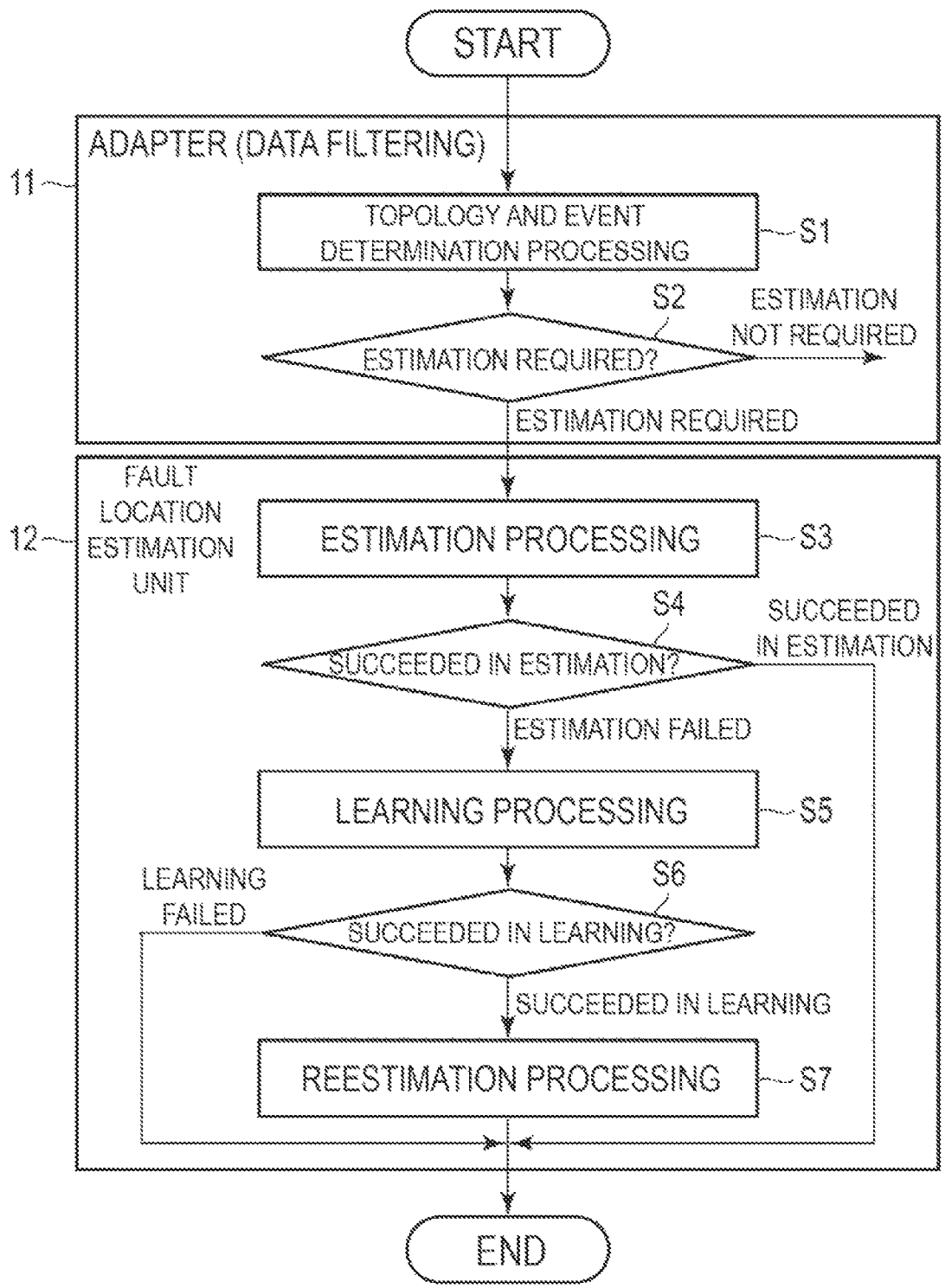
FIG. 3 is a flowchart illustrating an overall processing procedure and processing contents of anomaly location estimation processing performed by the anomaly location estimation apparatus illustrated in FIG. 1.

Next, an operation of the anomaly location estimation apparatus 1 configured as described above will be described.
(1) Overall Processing
First, the overall operation of the anomaly location estimation apparatus 1 will be described. FIG. 3 is a flowchart illustrating an overall processing procedure and processing contents performed by the anomaly location estimation apparatus 1.

The anomaly location estimation apparatus 1 first performs topology and event determination processing in step S1 under control of the adapter 11 of the rule generation and control unit 10. The topology and event determination processing will be described in detail below. Based on the result of the above-described topology and event determination processing, the anomaly location estimation apparatus 1 determines in step S2 whether estimation processing of a failure location is required. Then, when it is determined that the estimation processing is required, the estimation processing of a failure location is performed as follows, under control of the estimation unit 12.

First, in step S3, the estimation unit 12 applies the rule sets 21 to 2n managed by the rule engine 20 to the event information and the topology information converted by the data conversion unit 30 to perform the estimation processing of the failure location. Then, it is determined in step S4 whether the failure location has been estimated based on the estimation result of the estimation processing, and when the failure location has been estimated, the processing is ended.

In contrast, when the estimation by the existing rule sets has failed, the estimation unit 12 extracts a unique combination of failure events from the event information in step S5, and uses the extracted unique combination as the condition part and failure factor information registered by the maintenance person as the conclusion part to perform learning processing. Then, the estimation unit 12 determines in step S6 whether a new rule has been generated as a result of the learning processing.

As a result of this determination, when a new rule has been generated, the estimation unit 12 adds the newly generated rule to the rule sets 21 to 2n of the rule engine 20, and stores a rule ID of the newly generated rule in the topology and event data storage unit 13 in association with a failure ID. Then, in step S7, the estimation unit 12 executes the estimation processing of the failure occurrence location again based on the newly generated rule and ends the processing. Note that when a new rule has not been generated in the learning processing S5, that is, when the learning processing has failed, the estimation unit 12 ends the processing.
(2) Topology and Event Determination Processing
Next, an example of the topology and event determination processing by the adapter 11 will be described.

Figure 4:
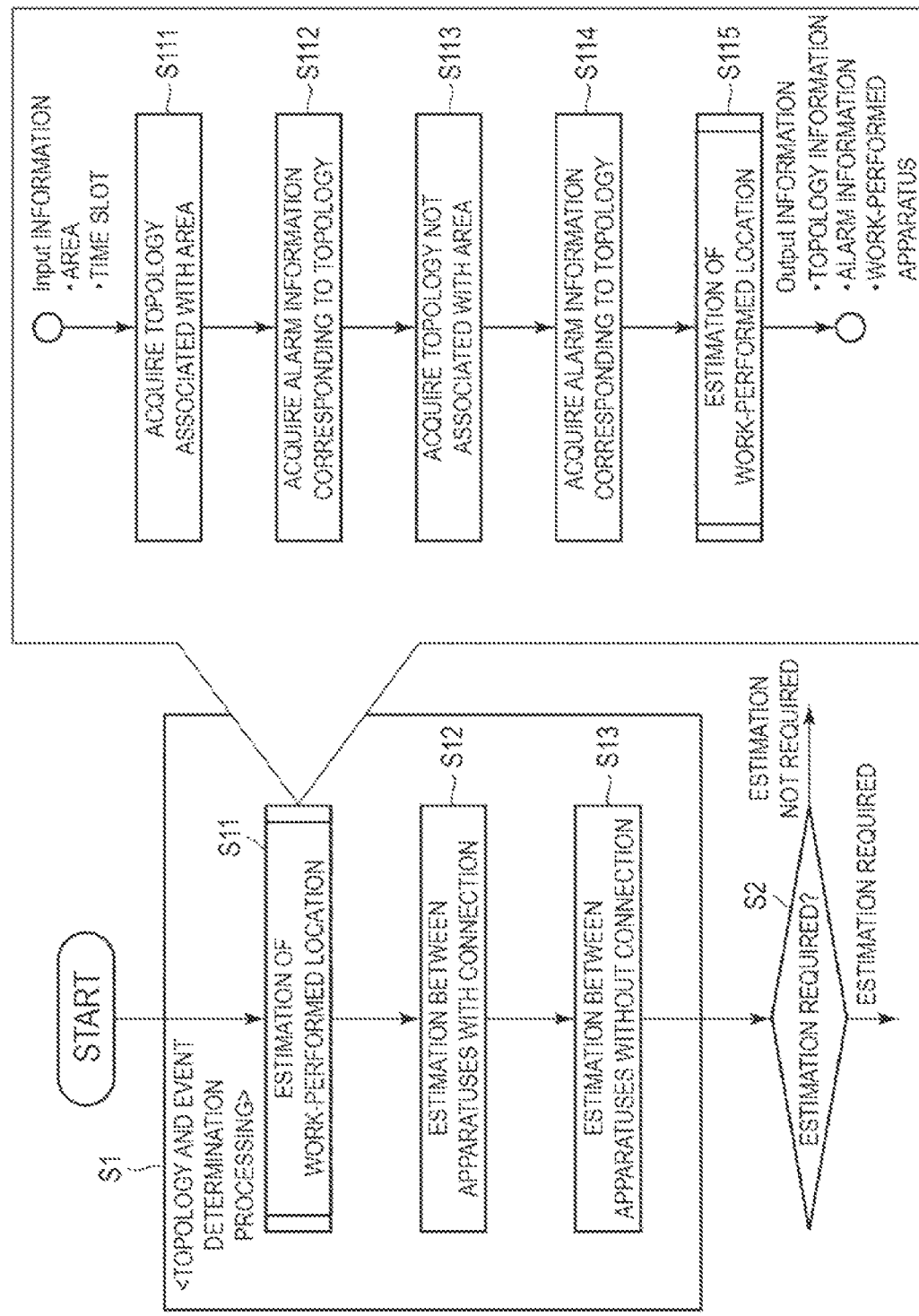
FIG. 4 is a flowchart illustrating a procedure and processing contents of work-performed location estimation processing in topology and event determination processing of the anomaly location estimation processing illustrated in FIG. 3.

As illustrated in FIG. 4, the topology and event determination processing includes estimation processing of the work-performed location (step S11), estimation processing between apparatuses with connection (step S12), and estimation processing between apparatuses without connection (step S13).
(2-1) Estimation of Work-Performed Location
The estimation processing of the work-performed location is performed as follows. Based on information representing an estimation target area and a time slot input by the maintenance person, a piece of the topology information associated with the area is first acquired from the data conversion unit 30 in step S111. Then, in step S112, a piece of the event information corresponding to the piece of the topology information is acquired from the data conversion unit 30. Furthermore, a piece of the topology information not associated with the area is acquired from the data conversion unit 30 in step S113. Then, in step S112, a piece of the event information corresponding to the piece of the topology information is acquired from the data conversion unit 30.

Figure 5:
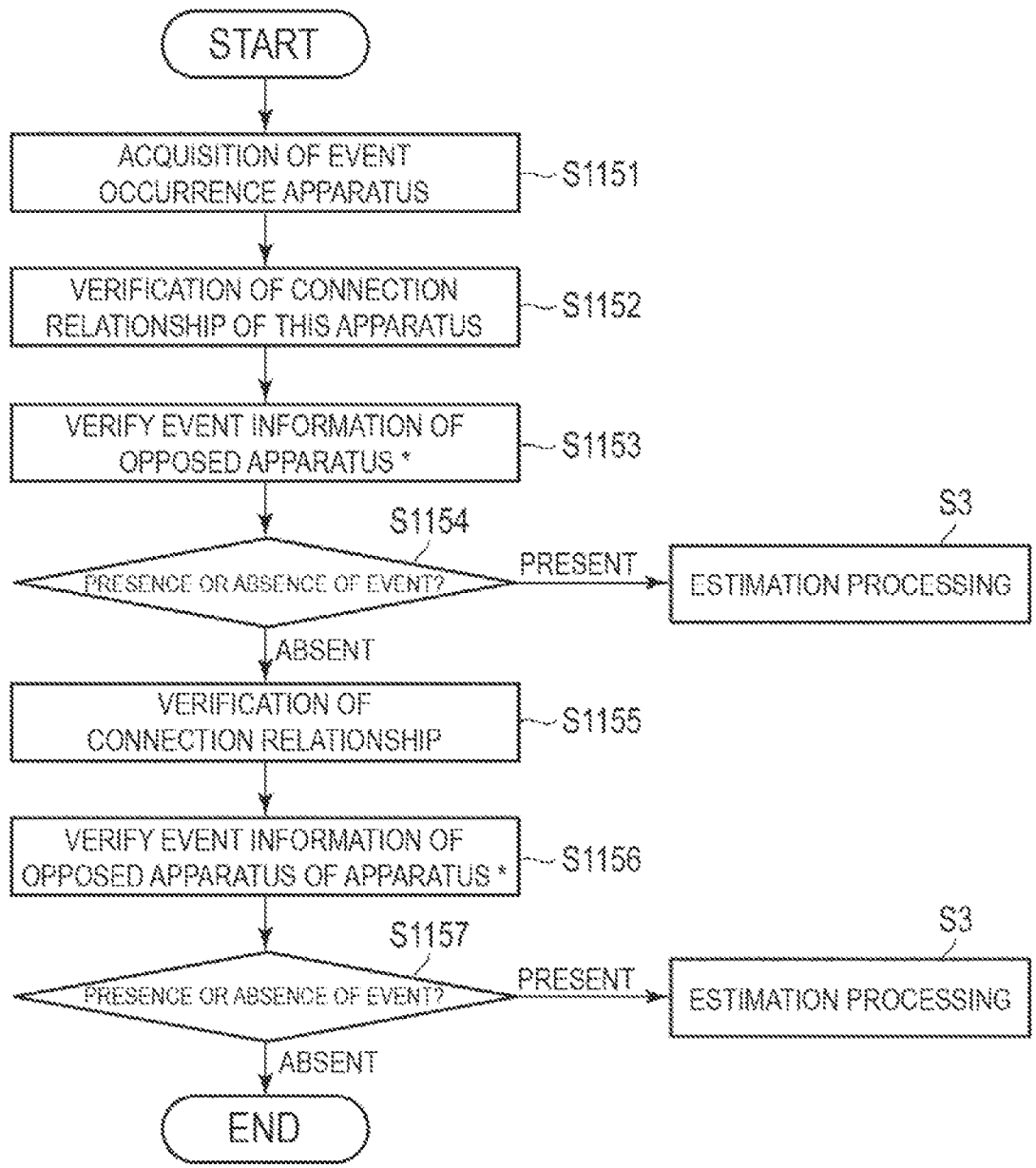
FIG. 5 is a flowchart illustrating an example of a processing procedure and processing contents of the work-performed location estimation processing illustrated in FIG. 4.

Next, in step S115, a location at which the work has been performed, that is, a work-performed apparatus, is estimated based on the acquired pieces of the event information. FIG. 5 is a flowchart illustrating a processing procedure and processing contents thereof.

First, in step S1151, information representing an apparatus in which an event has occurred (apparatus of alarm occurrence source) is acquired, and a connection relationship of the apparatus is verified based on the topology information. Then, an apparatus opposed to the apparatus in which the event has occurred is selected as a candidate for a work-performed location, and an event occurrence status of the selected apparatus is acquired in step S1153. Then, in step S1154, it is determined whether an event has occurred in the opposed apparatus.

As a result of the determination, when no event has occurred in the apparatus opposed to the apparatus in which the event has occurred, in step S1155, connection relationships between the opposed apparatus and other surrounding apparatuses thereof are then verified by using the topology information. The event occurrence statuses of the other surrounding apparatuses are acquired by step S1156. Then, it is determined in step S1157 whether an event has occurred in each of the other apparatuses.

As a result of the determination, when no event has occurred in any of the apparatus selected as the candidate for the work-performed location described above and the surrounding apparatuses thereof, the apparatus selected as the candidate for the work-performed location described above is estimated as the work-performed apparatus. In this case, the processing transitions to the estimation processing between apparatuses with connection (step S12).

Note that when an event has occurred in any of the above-described apparatus opposed to the apparatus in which the event has occurred or the above-described other apparatuses, it is determined that a failure not caused by the performance of the work has occurred in these apparatuses, the estimation processing between apparatuses with connection and the estimation processing between apparatuses without connection are not performed, and the processing transitions to the estimation processing of the failure location (step S3).

(2-2) Estimation Between Apparatuses with Connection

The estimation processing between apparatuses with connection is processing of calculating a degree of assurance based on alarm occurrence statuses of an apparatus estimated as the work-performed location and surrounding opposed apparatuses whose connection relationships with the work-performed apparatus are defined in the topology information, and a filtering rule, to estimate whether occurrence of an alarm by the opposed apparatuses is caused by the work performance or by occurrence of a usage harm, and is performed as follows.

Figure 6:
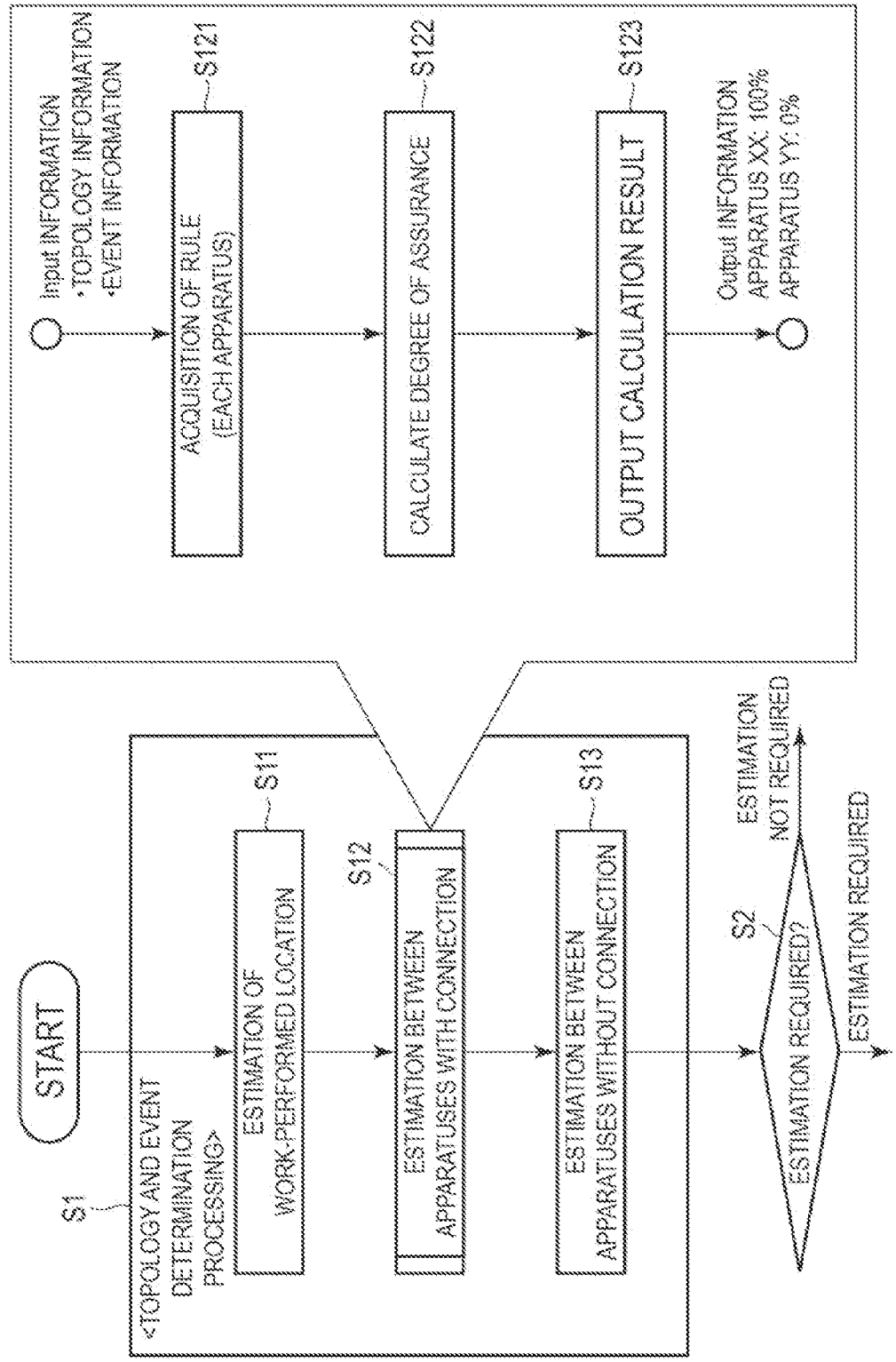
FIG. 6 is a flowchart illustrating a procedure and processing contents of estimation processing between apparatuses with connection setting in the topology and event determination processing of the anomaly location estimation processing illustrated in FIG. 3.

FIG. 6 is a flowchart illustrating the processing procedure and processing contents. The adapter 11 first acquires a filtering rule from the rule engine 20 in step S121 based on the topology information and the event information acquired from the data conversion unit 30. Next, in step S122, the degree of assurance with respect to the estimation result of the work-performed apparatus is calculated based on event occurrence statuses of apparatuses whose connection relationships with the work-performed apparatus are defined in the topology information.

The degree of assurance can be calculated as follows:

degree of assurance [%]=(number of rules of work-performed apparatuses)/(number of work-performed apparatuses)×(number of rules of opposed apparatuses)/(number of opposed apparatuses)×100.

If the number of the work-performed apparatuses coincides with the number of rules thereof, and the number of opposed apparatuses whose connection relationships with the work-performed apparatus are defined in the topology information coincides the number of rules thereof, the degree of assurance with respect to the estimation result of the work-performed apparatus is 100%, and the degree of assurance with respect to the alarm occurrence in the opposed apparatuses is 0%.

(2-3) Estimation Between Apparatuses without Connection

The estimation processing between apparatuses without connection is processing of calculating a degree of assurance based on synchronism of alarm occurrence times between surrounding opposed apparatuses whose connection relationships with an apparatus estimated as the work-performed location are defined in the topology information and other opposed apparatuses whose connection relationships with the apparatus estimated as the work-performed location are not defined in the topology information, and is performed as follows.

Figure 7:
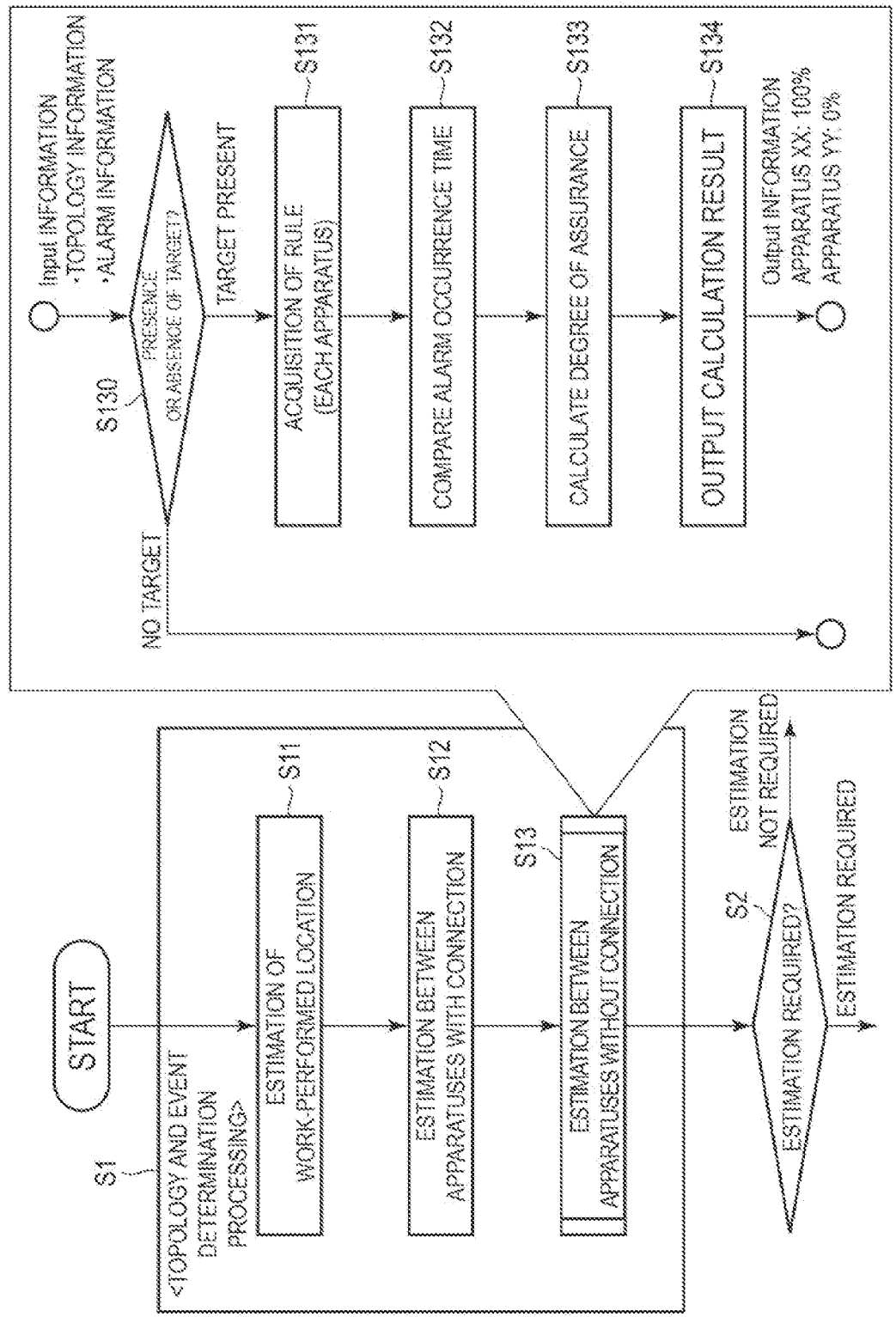
FIG. 7 is a flowchart illustrating a procedure and processing contents of estimation processing between apparatuses without connection setting in the topology and event determination processing of the anomaly location estimation processing illustrated in FIG. 3.

FIG. 7 is a flowchart illustrating the processing procedure and processing contents. Based on the topology information and the event information acquired from the data conversion unit 30, the adapter 11 first determines presence or absence of an apparatus to be a comparison target for the alarm occurrence time in step S130.

As a result of the determination, when there are target apparatuses, the filtering rule is acquired from the rule engine 20 in step S131. Next, in step S132, the alarm occurrence times of target opposed apparatuses are extracted from the acquired alarm information and compared. Then, in step S133, the degree of assurance with respect to the alarm is calculated based on the comparison result of the alarm occurrence times described above.

The degree of assurance can be calculated as follows:

degree of assurance [%]=(alarm occurrence time of opposed apparatus whose connection is defined)/(alarm occurrence time of opposed apparatus whose connection is not defined)×100.

That is, if the alarm occurrence time of the opposed apparatus whose connection relationship with the work-performed apparatus is defined on the topology and the alarm occurrence time of the opposed apparatus whose connection relationship with the work-performed apparatus is not defined on the topology coincide with each other within a predetermined time difference, the degree of assurance with respect to the estimation result of the work-performed apparatus described above is 100%, and the degree of assurance with respect to alarm occurrence due to a failure of another opposed apparatus whose connection relationship with the work-performed apparatus is not defined is 0%.

In the estimation processing between apparatuses with connection or the estimation processing between apparatuses without connection, when the degree of assurance with respect to the work-performed apparatus is not 100% or when the degree of assurance with respect to the alarm occurrence due to a failure of an opposed apparatus is not 0%, the adapter 11 assumes that there may be a failure in any location in the system, and the processing transitions to the estimation processing of the failure location S3.

(3) Specific Example of Topology and Event Determination Processing Specific examples of the topology and event determination processing described above will be described using FIGS. 8 to 15.

Figure 8:
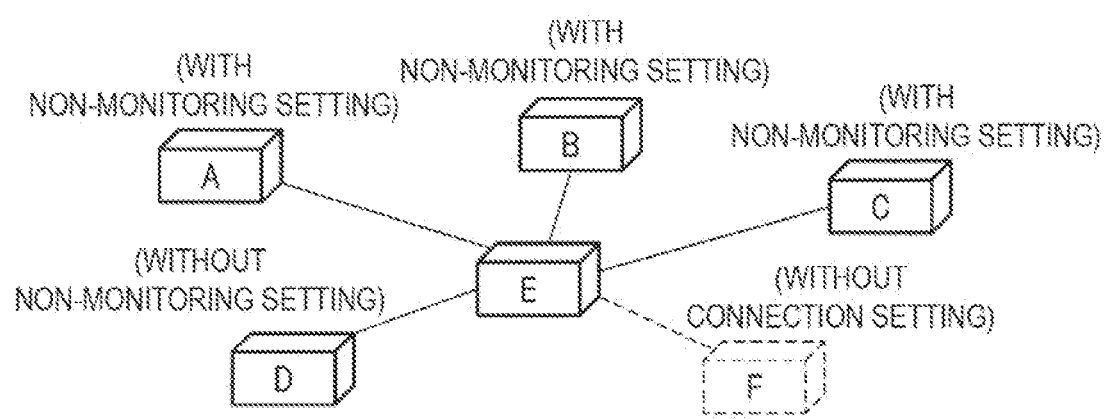
FIG. 8 is a diagram for explaining an example of a non-monitoring setting result for apparatuses.

For example, it is assumed that in performing the work in an area illustrated in FIG. 8 in which apparatuses A to F are included, for the apparatuses A to C, a non-monitoring setting of excluding them from monitoring targets is performed, the non-monitoring setting is not performed for the apparatuses D and F. and connection setting between the apparatus F and the apparatus E is not performed in the network connection information (topology information).

Figure 9:
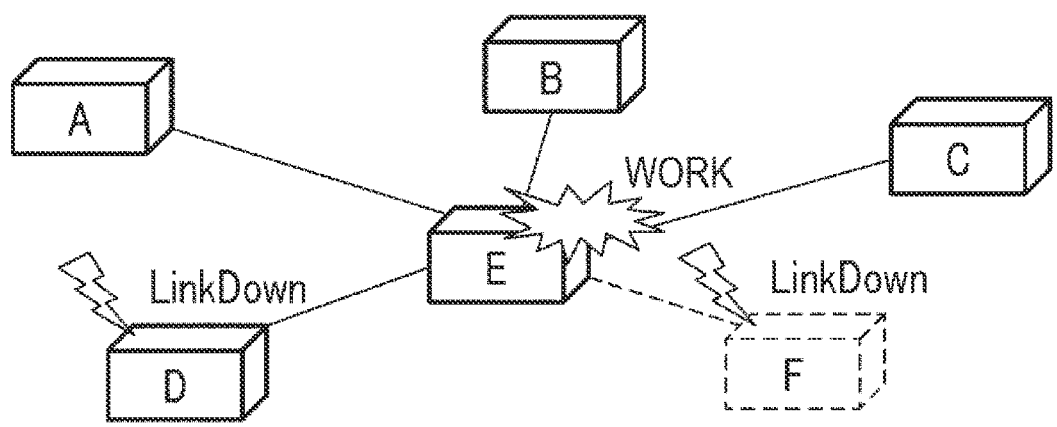
FIG. 9 is a diagram illustrating an example of a work-performed location and an alarm occurrence location in the apparatuses illustrated in FIG. 8.

In this case, for example, when the work is performed in the apparatus E as illustrated in FIG. 9, an alarm (Link Down) occurs from each of the apparatus D not subjected to the non-monitoring setting and the apparatus F without connection setting.

(3-1) Estimation of Work-Performed Location

Figure 13:
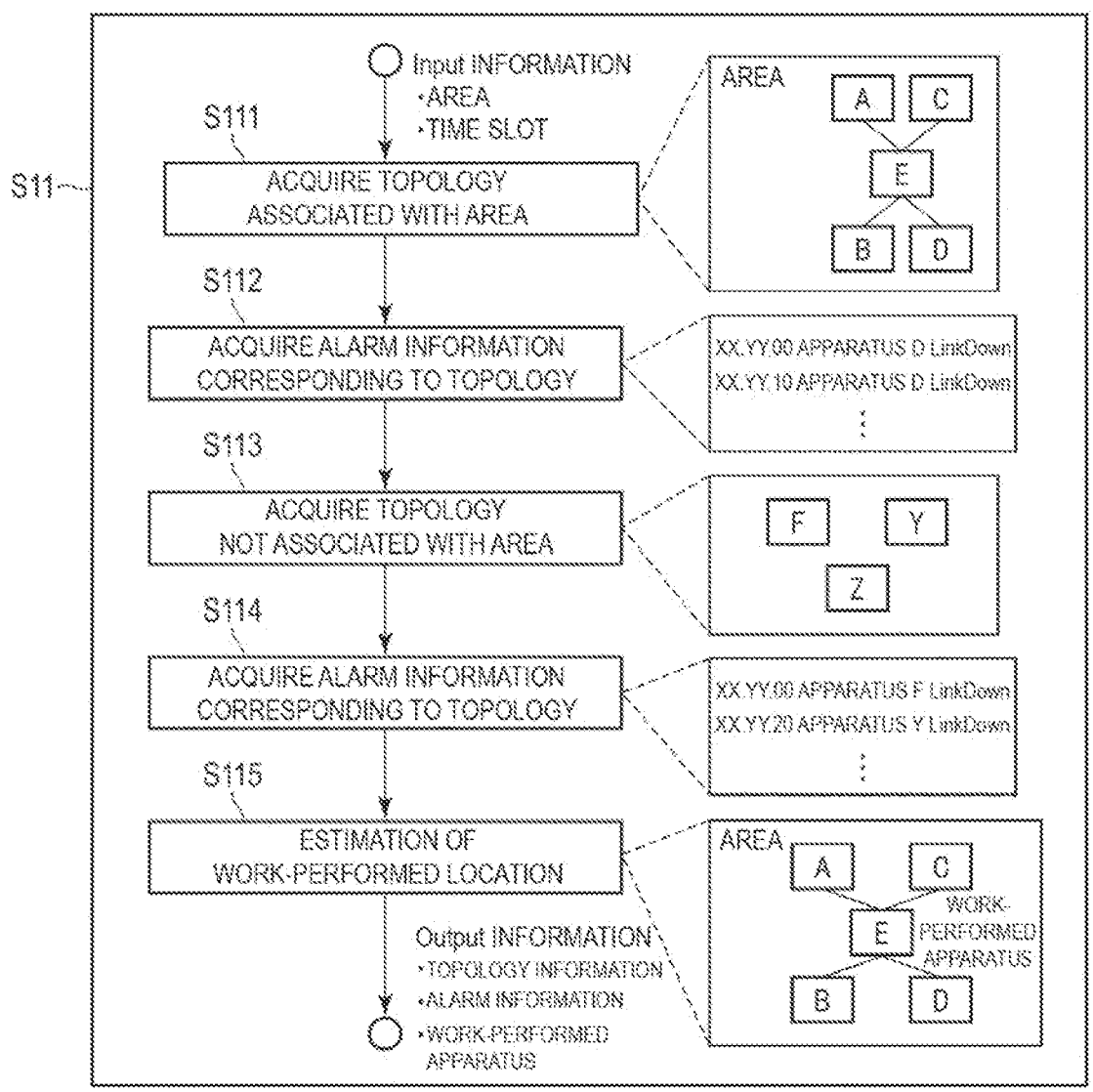
FIG. 13 is a diagram for explaining a specific example of the work-performed location estimation processing illustrated in FIGS. 4 and 5.

The adapter 11 first acquires a piece of the topology information associated with the area in step S11, as illustrated in FIG. 13. In this example, the apparatuses A to E are acquired. The adapter 11 then acquires alarm information corresponding to the piece of the topology information described above in step S112. In this example, "XX.YY00 Apparatus D Link Down", "XX.YY.10 Apparatus D Link Down", . . . are acquired at a fixed time interval.

The adapter 11 then acquires a piece of the topology information not associated with the area in step S113. As a result, for example, apparatuses F, Y, and Z are acquired. The adapter 11 then acquires alarm information corresponding to the acquired piece of the topology information in step S114.

As a result, for example, "XX.YY.00 Apparatus F Link Down", "XX.YY.10 Apparatus Y Link Down", . . . are acquired.

Figure 10:
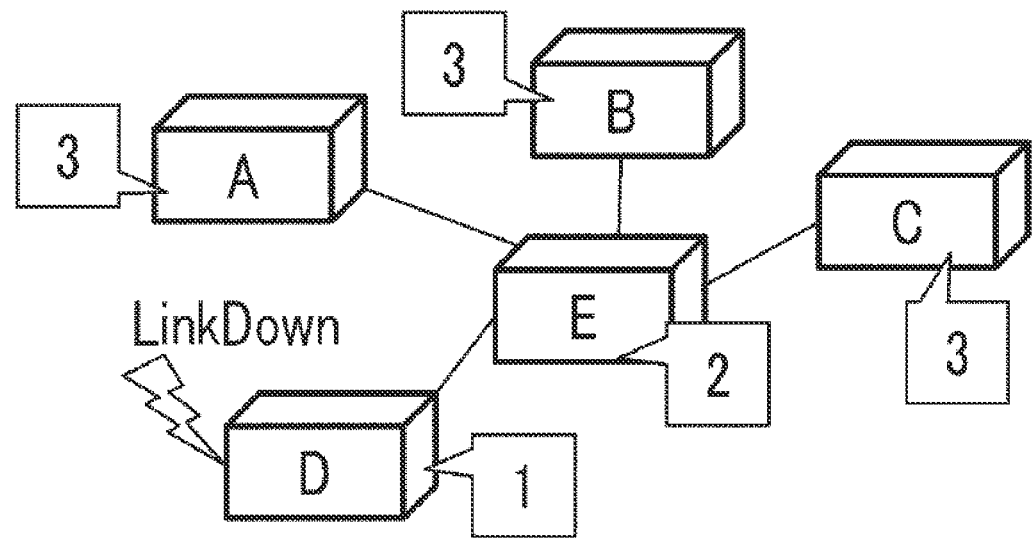
FIG. 10 is a diagram illustrating a procedure of performing the work-performed location estimation processing illustrated in FIGS. 4 and 5.

The adapter 11 then performs processing of steps S1151 to S1157 illustrated in FIG. 5 based on the pieces of the topology information and the alarm information acquired in steps S111 to S114 described above, thereby estimating the work-performed apparatus in step S115. In this example, the apparatus E is estimated as the work-performed apparatus. FIG. 10 illustrates the procedure of the estimation processing of the work-performed apparatus described above.

(3-2) Estimation Between Apparatuses with Connection

Figure 11:
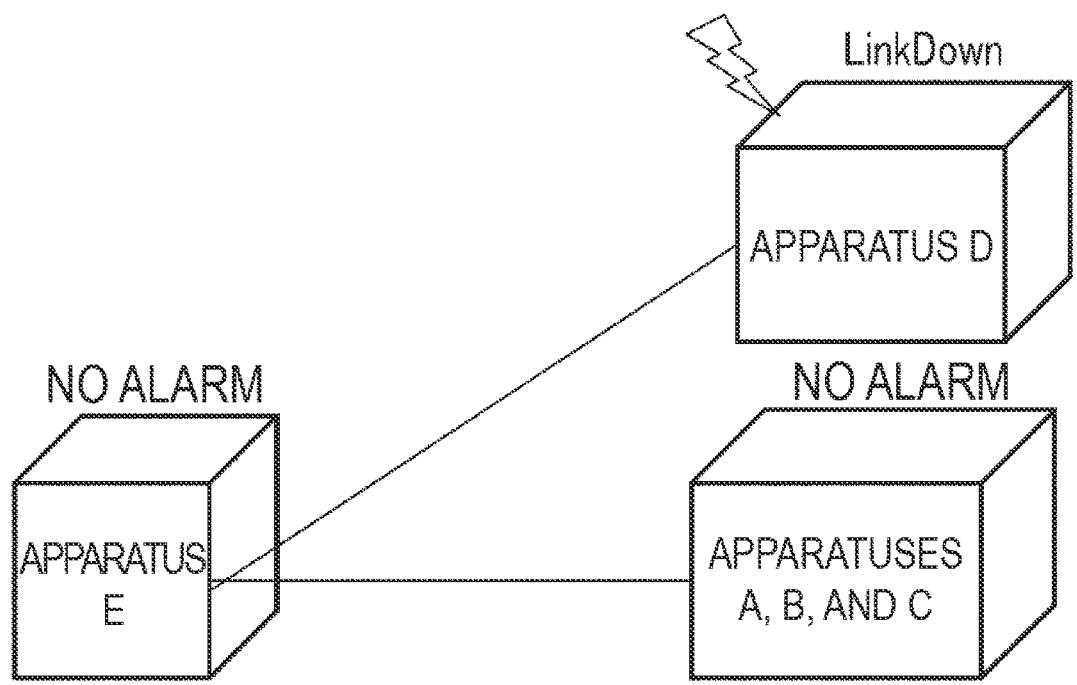
FIG. 11 is a diagram for explaining an example of the estimation processing between the apparatuses with connection setting illustrated in FIG. 6.
Figure 14:
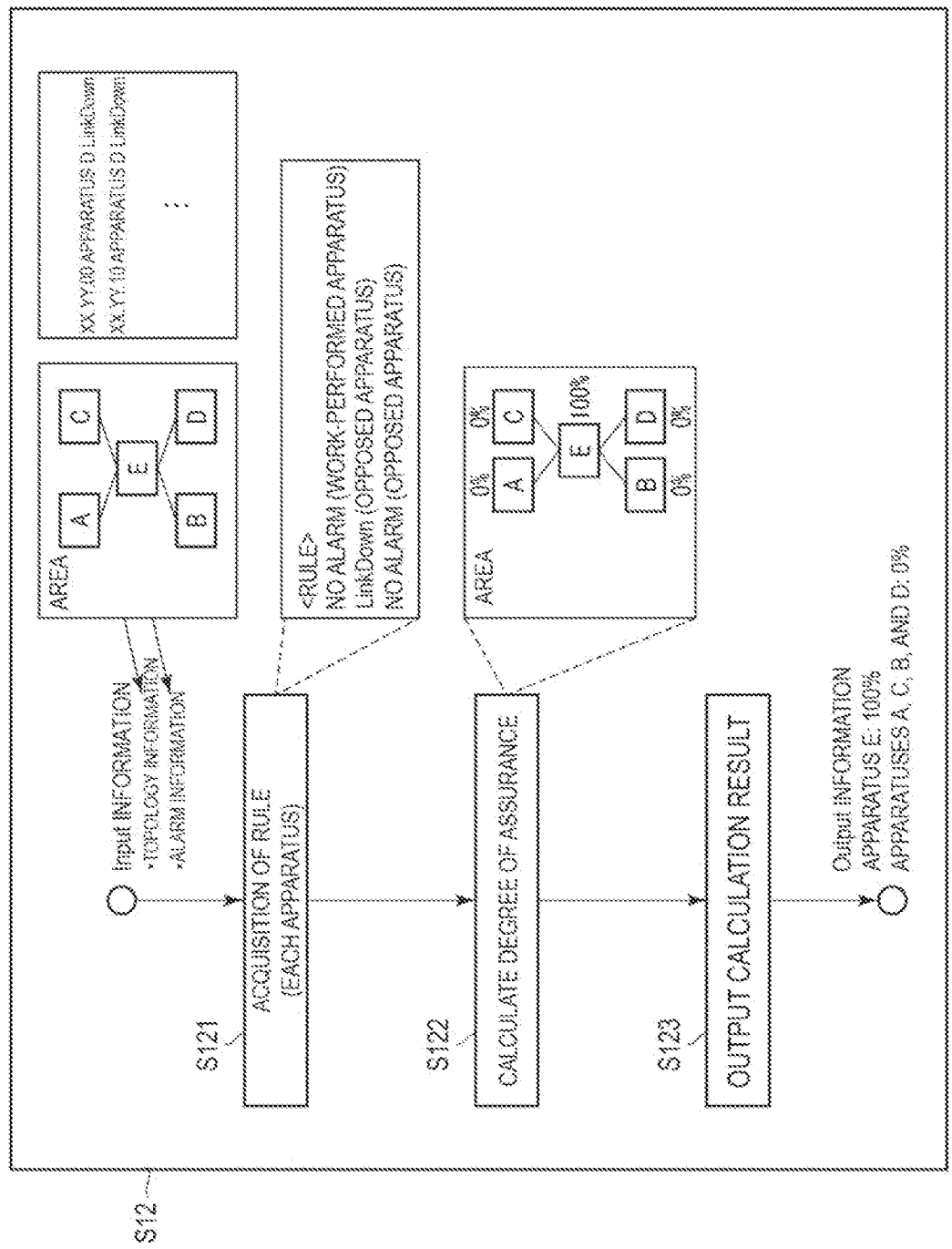
FIG. 14 is a diagram for explaining a specific example of the estimation processing between the apparatuses with connection setting illustrated in FIG. 6.

When the work-performed apparatus is estimated in the estimation processing of the work-performed location described above, the adapter 11 calculates, in step S12, a degree of assurance between the estimated work-performed apparatus E and the surrounding apparatuses A to D whose connection relationships with the apparatus E are defined on the topology as follows. FIG. 11 is a diagram illustrating an outline of the estimation processing between apparatuses with connection. FIG. 14 is a diagram illustrating the processing procedure and processing contents of the estimation processing between apparatuses with connection.

That is, the adapter 11 first receives a piece of the topology information (apparatuses A to E) associated with the area and the alarm information "XX.YY.00 Apparatus D Link Down", "XX.YY.10 Apparatus D Link Down", . . . . Then, filtering rules are acquired in step S121. In this example, "No alarm (work-performed apparatus)", "Link Down (opposed apparatus)", and "No alarm (opposed apparatus)" are acquired.

The adapter 11 then calculates a degree of assurance in accordance with the above-mentioned calculation equation in step S122. In this example, the number of the work-performed apparatus E and the number of rules thereof each are "1" and coincide with each other, and the number of the opposed apparatuses A to D whose connection relationships with the work-performed apparatus E are defined on the topology and the number of rules thereof each are "4" and also coincide with each other, so that the degree of assurance with respect to the estimation result of the work-performed apparatus E described above is 100%. In addition, the degree of assurance with respect to the alarm occurrence due to the failure of the opposed apparatuses A to D is 0%.

The adapter 11 outputs the calculation results of the degrees of assurance with respect to the apparatuses A to E from the GUI 40 to the display unit 8 and causes the display unit 8 to display the calculation results in step S123. Accordingly, the maintenance person can recognize the work-performed apparatus E from the calculation results of the degrees of assurance displayed on the display unit 8, and determine that the alarm generated from the opposed apparatus D is caused by the performance of the work, thereby eliminating the necessity of isolating alarm occurrence factors.

(3-3) Estimation Between Apparatuses without Connection

Figure 12:
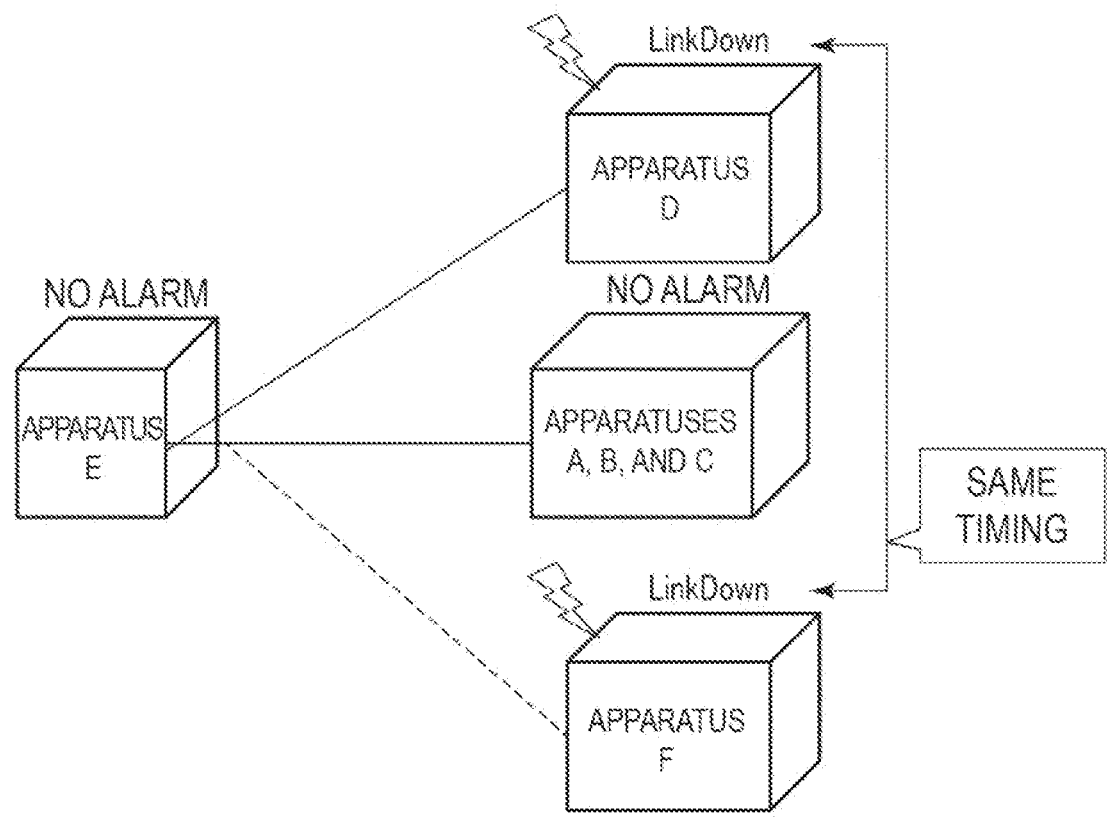
FIG. 12 is a diagram for explaining an example of the estimation processing between the apparatuses without connection setting illustrated in FIG. 7.
Figure 15:
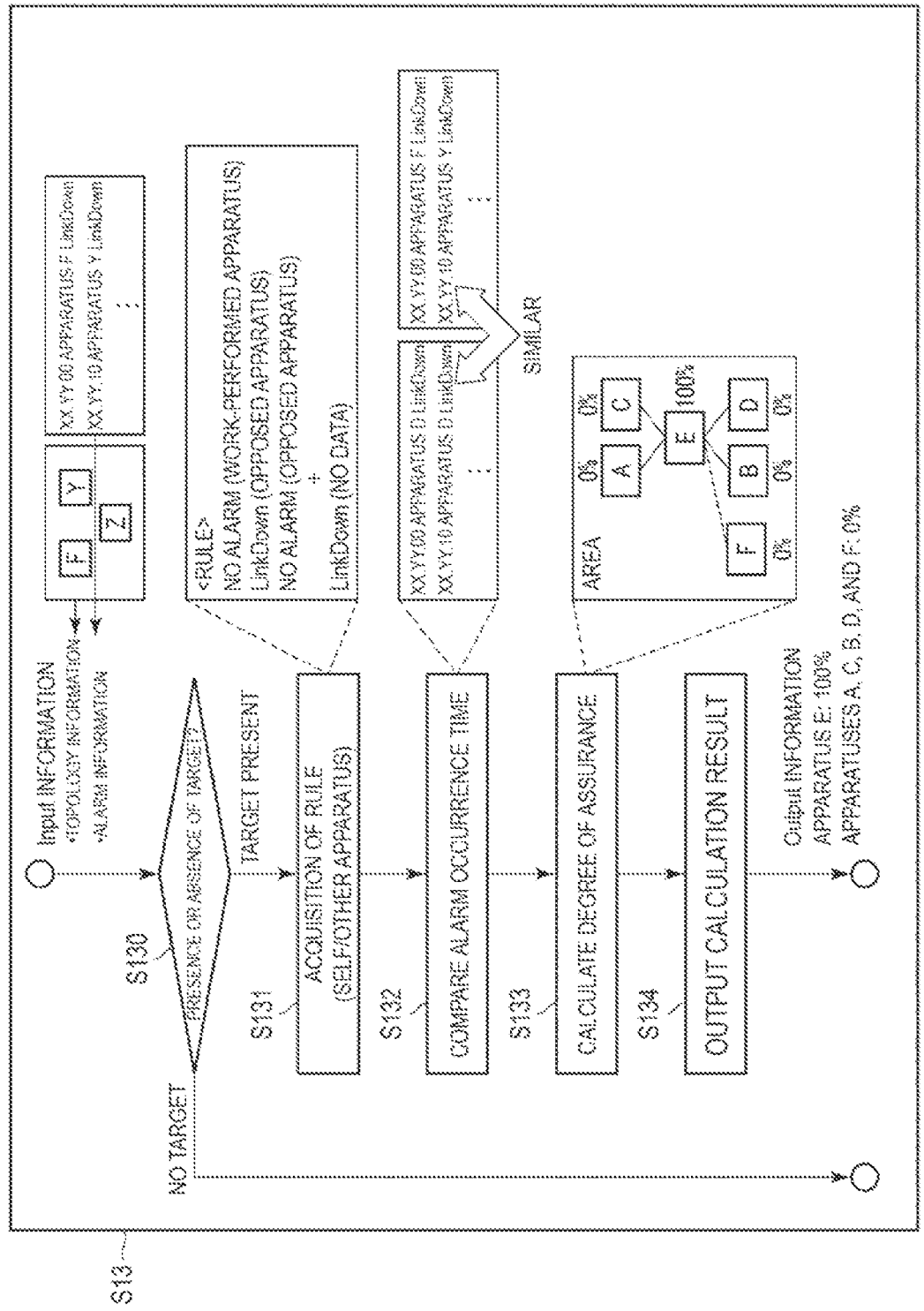
FIG. 15 is a diagram for explaining a specific example of the estimation processing between the apparatuses without connection setting illustrated in FIG. 7.

Upon completion of the estimation processing between apparatuses with connection, the adapter 11 subsequently performs estimation processing between apparatuses without connection in step S13 in the following procedure. FIG. 12 is a diagram illustrating an outline of the estimation processing between apparatuses without connection. FIG. 15 is a diagram illustrating the processing procedure and processing contents of the estimation processing between apparatuses without connection.

The adapter 11 receives a piece of the topology information (apparatuses F, Y, Z) not associated with the area described above and the alarm information "XX.YY.00 Apparatus F Link Down". "XX.YY.10 Apparatus Y Link Down" . . . , and first determines presence or absence of an apparatus to be compared for the alarm occurrence time in step S130. In this example, the alarm is generated from the apparatuses F and Y, and thus it is determined that "there is a target". The adapter 11 then acquires filtering rules in step S131. In this example, "No alarm (work-performed apparatus)". "Link Down (opposed apparatus)", "No alarm (opposed apparatus)", and "Link Down (no data)" are acquired.

The adapter 11 then compares an alarm occurrence time "XX.YY.00 Apparatus D Link Down" by the opposed apparatus D whose connection relationship with the work-performed apparatus E is defined in the topology information and an alarm occurrence time "XX.YY00 Apparatus F Link Down" by the opposed apparatus F whose connection relationship with the work-performed apparatus E is not defined in the topology information in step S132. Then, in step S133, the degree of assurance is calculated in accordance with the calculation equation of the degree of assurance described above. As a result, in this example, the alarm occurrence time "XX.YY00 Apparatus D Link Down" by the opposed apparatus D and the alarm occurrence time "XX.YY00 Apparatus F Link Down" by the opposed apparatus F are the same, so that the degree of assurance with respect to the apparatus E previously estimated as the work-performed location is 100%. In addition, the degrees of assurance with respect to the alarm occurrences due to failures of the opposed apparatuses D and F are 0%.

Similarly, the adapter 11 also compares the alarm occurrence time "XX.YY.10 Apparatus D Link Down" by the opposed apparatus D and the alarm occurrence time "XX.YY.10 Apparatus Y Link Down" by the opposed apparatus Y. Ten, in step S133, the degree of assurance is calculated in accordance with the calculation equation of the degree of assurance described above. As a result, in this example, the alarm occurrence time "XX.YY.10 Apparatus D Link Down" by the opposed apparatus D and the alarm occurrence time "XX.YY.10 Apparatus Y Link Down" by the opposed apparatus Y are the same, so that the degree of assurance with respect to the apparatus E estimated as the work-performed location is 100%. In addition, the degrees of assurance with respect to the alarm occurrences due to the failures of the opposed apparatuses D and Y are 0%.

The adapter 11 outputs the calculation results of the degrees of assurance with respect to the apparatuses A to E. F, and Y from the GUI 40 to the display unit 8 and causes the display unit 8 to display the calculation results in step S134. Accordingly, the maintenance person recognizes the work-performed apparatus E from the calculation results of the degrees of assurance displayed on the display unit 8, and in addition, recognizes that the alarms generated from the apparatuses F and Y without connection setting are generated at the same time as the alarm generated from the opposed apparatus D, so that the maintenance person can determine that the alarms generated from the apparatuses F and Y are also caused by the performance of the work.

Actions and Effects

As described above, in the embodiment of the present disclosure, in the rule generation and control unit 10 of the anomaly location estimation apparatus 1, the adapter 11 having a topology and event determination processing function is disposed in a preceding stage of the estimation unit 12 of the failure location. In the topology and event determination processing, first, the estimation processing of the work-performed location S11 is performed to estimate the work-performed apparatus. Then, when the work-performed apparatus is estimated, in the estimation processing between apparatuses with connection S12, the degree of assurance is calculated based on the number of work-performed apparatuses and the number of filtering rules corresponding to alarm occurrence statuses of the work-performed apparatuses, as well as the number of opposed apparatuses whose connection relationships with the work-performed apparatuses are defined and the number of filtering rules corresponding to alarm occurrence statuses of the opposed apparatuses. Furthermore, in the estimation processing between apparatuses without connection S13, the degree of assurance is calculated based on the synchronism of the alarm occurrence timing between the opposed apparatus whose connection relationship with the work-performed apparatus is defined and the opposed apparatus whose connection relationship with the work-performed apparatus is not defined.

Accordingly, according to the embodiment, based on the estimation result of the work-performed apparatus and the calculation result of each of the degrees of assurance, it is possible to automatically isolate whether the alarm occurrence is caused by a failure or by a setting information flaw involved in the work. That is, it is possible to isolate whether occurrence of the alarm is caused by an anomaly such as a failure or by a flaw in the topology or alarm detection conditions without relying on determination by the maintenance person. This makes it possible to significantly reduce the time and effort of the maintenance person required for anomaly location estimation.

As described above, the degree of assurance in the estimation processing between apparatuses with connection is calculated based on the number of work-performed apparatuses and the number of filtering rules corresponding to alarm occurrence statuses of the apparatuses, as well as the number of opposed apparatuses whose connection relationships with the work-performed apparatuses are defined and the number of filtering rules corresponding to alarm occurrence statuses of the opposed apparatuses. Furthermore, the degree of assurance in the estimation processing between apparatuses without connection is calculated based on the synchronism of the alarm occurrence timing between the opposed apparatus whose connection relationship with the work-performed apparatus is defined and the opposed apparatus whose connection relationship with the work-performed apparatus is not defined.

Accordingly, it is possible to simply determine the degree of assurance without referring to a past alarm occurrence history, thereby making it possible to reduce the processing load of the apparatus.

OTHER EMBODIMENTS

In the above-described embodiment, the description has been given taking, for an example, a case in which the processing function of the anomaly location estimation apparatus is provided, for example, in a maintenance terminal, whereas the processing function may be provided in a management server or the like located on an upper level of the system. Alternatively, one or more of apparatuses to be monitored may be provided with the above-described processing function. In any case, the processing function of the anomaly location estimation apparatus has the function of collecting and managing attribute information of the apparatuses, information indicating connection statuses between the apparatuses, and alarm information generated from the apparatuses.

In addition, in the above-described embodiment, the description has been given taking, for an example, a case in which the anomaly location estimation apparatus includes both a data filtering function by the adapter 1I and a failure location estimation function by the estimation unit 12. However, the data filtering function by the adapter 11 and the failure location estimation function by the estimation unit 12 may be provided in separate apparatuses to transfer an isolation result of the data filtering function of one apparatus to the failure location estimation function of the other apparatus.

In addition, types and connection configuration of apparatuses, the processing procedure and processing contents of the data filtering, types of the anomaly to be estimated, and the like may also be variously modified without departing from the gist of the present disclosure.

In short, the present disclosure is not limited to the above embodiment and can be variously modified in the implementation stage without departing from the gist of the present disclosure. Also, the embodiments may appropriately be performed in combination as long as possible, and in such a case, combined effects can be obtained. Further, the aforementioned embodiments include the disclosure in various stages, and various disclosures can be extracted from appropriate combinations of a plurality of disclosed components.

REFERENCE SIGNS LIST

1 Anomaly location estimation apparatus
2 Control unit
3 Program storage unit
4 Data storage unit
5 Communication interface unit (communication I/F)
6 Input/output interface unit (input/output I/F)
7 Input unit
8 Display unit
9 Bus
10 Rule generation and control unit
11 Adapter (data filtering)
12 Estimation unit
13 Topology and event data storage unit
20 Rule engine
30 Data conversion unit
40 Input/output interface unit (GUI)

The invention claimed is:

1. An anomaly location estimation apparatus comprising:
a processor; and
a storage medium having computer program instructions stored thereon, when executed by the processor, perform to:
acquire topology information representing a connection configuration between a plurality of apparatuses constituting a communication network and event information representing occurrence statuses of an event by the plurality of apparatuses;
estimate, based on the topology information and the event information acquired, a first apparatus corresponding to a failure factor location from among the plurality of apparatuses;
in a case where estimation using existing rules fails:
extract a unique combination of failure events from the event information;
use the extracted unique combination as a condition; and perform learning processing and generating a new rule using the extracted unique combination as the condition and failure factor information as a conclusion;

generate, when the first apparatus is estimated, based on an occurrence status of the event by a second apparatus whose connection relationship with the first apparatus is defined by the topology information, information for estimating whether an occurrence of the event by the second apparatus is caused by the failure factor location or by another anomaly;

generate, when the first apparatus is estimated, based on a relationship between an occurrence status of the event by the first apparatus and an occurrence status of the event by a third apparatus whose connection relationship with the first apparatus is not defined by the topology information, information for estimating whether an occurrence of the event by the third apparatus is caused by the failure factor location or by another anomaly;

extract, based on the topology information and the event information, an apparatus where the event is occurred, select, as a candidate for the first apparatus, an apparatus whose connection relationship with the apparatus extracted is defined in the topology information to determine whether the event has occurred by the candidate for the first apparatus selected;

select, as the second apparatus, an apparatus whose connection relationship with the apparatus selected is defined in the topology information to determine whether the event has occurred by the apparatus selected as the second apparatus;

estimate the candidate for the first apparatus as the first apparatus corresponding to the failure factor location when it is determined that the event has not occurred in neither the candidate for the first apparatus nor the apparatus selected as the second apparatus; and output information representing that the first apparatus estimated is the failure factor location on a display.

2. The anomaly location estimation apparatus according to claim 1, wherein the computer program instructions further perform to acquire, based on the topology information and the event information, filtering rules corresponding to occurrence statuses of the event by the apparatus where the event is occurred, the first apparatus and the second apparatus, calculate a first degree of assurance based on a ratio of the number of a plurality of the first apparatuses to the number of the filtering rules corresponding to occurrence statuses of the event by the first apparatuses, and a ratio of the number of the apparatus where the event is occurred and a plurality of the second apparatuses to the number of filtering rules corresponding to occurrence statuses of the event by the apparatus and the second apparatuses, and output the first degree of assurance calculated as information for estimating whether occurrences of the event by the second apparatuses are caused by the failure factor location or by another anomaly.

3. The anomaly location estimation apparatus according to claim 1, wherein the computer program instructions further perform to acquire, based on the topology information and the event information, filtering rules corresponding to occurrence statuses of the event by the first apparatus, the second apparatus, and the third apparatus, calculate a second degree of assurance based on the filtering rules acquired and a comparison result between an occurrence time of the event by the second apparatus and an occurrence time of the event by the third apparatus, and output the second degree of assurance calculated as information for estimating whether an occurrence of the event by the third apparatus is caused by the failure factor location or by another anomaly.

4. An anomaly location estimation method performed by an information processing apparatus including a hardware processor and a memory, the anomaly location estimation method comprising:

acquiring topology information representing a connection configuration between a plurality of apparatuses constituting a communication network and event information representing occurrence statuses of an event by the plurality of apparatuses;

estimating, based on the topology information and the event information acquired, a first apparatus corresponding to a failure factor location from among the plurality of apparatuses;

in a case where estimation using existing rules fails:
extracting a unique combination of failure events from the event information;
using the extracted unique combination as a condition; and
performing learning processing and generating a new rule using the extracted unique combination as the condition and failure factor information as a conclusion;

generating, based on an occurrence status of the event by a second apparatus whose connection relationship with the first apparatus estimated is defined by the topology information, information for estimating whether an occurrence of the event by the second apparatus is caused by the failure factor location or by another anomaly;

generating, based on a relationship between an occurrence status of the event by the first apparatus and an occurrence status of the event by a third apparatus whose connection relationship with the first apparatus is not defined by the topology information, information for estimating whether an occurrence of the event by the third apparatus is caused by the failure factor location or by another anomaly;

extracting, based on the topology information and the event information, an apparatus where the event is occurred, selecting, as a candidate for the first apparatus, an apparatus whose connection relationship with the apparatus extracted is defined in the topology information to determine whether the event has occurred by the candidate for the first apparatus selected;

selecting, as the second apparatus, an apparatus whose connection relationship with the apparatus selected is defined in the topology information to determine whether the event has occurred by the apparatus selected as the second apparatus;

estimating the candidate for the first apparatus as the first apparatus corresponding to the failure factor location when it is determined that the event has not occurred in neither the candidate for the first apparatus nor the apparatus selected as the second apparatus; and outputting information representing that the first apparatus estimated is the failure factor location on a display.

5. An anomaly location estimation apparatus comprising:

a processor; and a storage medium having computer program instructions stored thereon, when executed by the processor, perform to:

acquire topology information representing a connection configuration between a plurality of apparatuses constituting a communication network and event information representing occurrence statuses of an event by the plurality of apparatuses;

estimate, based on the topology information and the event information acquired, a first apparatus corresponding to a failure factor location from among the plurality of apparatuses;

in a case where estimation using existing rules fails:
  extract a unique combination of failure events from the event information;
  use the extracted unique combination as a condition; and
  perform learning processing and generating a new rule using the extracted unique combination as the condition and failure factor information as a conclusion;

generate, when the first apparatus is estimated, based on an occurrence status of the event by a second apparatus whose connection relationship with the first apparatus is defined by the topology information, information for estimating whether an occurrence of the event by the second apparatus is caused by the failure factor location or by another anomaly;

generate, when the first apparatus is estimated, based on a relationship between an occurrence status of the event by the first apparatus and an occurrence status of the event by a third apparatus whose connection relationship with the first apparatus is not defined by the topology information, information for estimating whether an occurrence of the event by the third apparatus is caused by the failure factor location or by another anomaly;

acquire based on the topology information and the event information, filtering rules corresponding to occurrence statuses of the event by apparatus where the event occurred, the first apparatus and the second apparatus;

calculate a first degree of assurance based on a ratio of the number of a plurality of the first apparatuses to the number of the filtering rules corresponding to occurrence statuses of the event by the first apparatuses, and a ratio of the number of the apparatus where the event occurred and a plurality of the second apparatuses to the number of filtering rules corresponding to occurrence statuses of the event by the apparatus and the second apparatuses; and output on a display the first degree of assurance calculated as information for estimating whether occurrences of the event by the second apparatuses are caused by the failure factor location or by another anomaly.

* * * * *